United States Patent [19]

Jacobs

[11] Patent Number: 4,464,502

[45] Date of Patent: Aug. 7, 1984

[54] LOW SMOKE PLASTICIZED POLYVINYL CHLORIDE

[75] Inventor: Martin I. Jacobs, Southbury, Conn.

[73] Assignee: Uniroyal, Inc., New York, N.Y.

[21] Appl. No.: 367,714

[22] Filed: Apr. 12, 1982

Related U.S. Application Data

[63] Continuation of Ser. No. 210,646, Nov. 26, 1980, abandoned, which is a continuation of Ser. No. 928,489, Jul. 27, 1978, abandoned, which is a continuation of Ser. No. 771,871, Feb. 25, 1977, abandoned, which is a continuation-in-part of Ser. No. 638,404, Dec. 8, 1975, abandoned.

[51] Int. Cl.$^3$ .......................... C08K 3/22; C08K 3/26
[52] U.S. Cl. ...................................... 524/411; 524/432
[58] Field of Search .............................. 524/411, 432

[56] References Cited

U.S. PATENT DOCUMENTS

| | | | |
|---|---|---|---|
| 3,019,205 | 1/1962 | Buckley et al. | 524/432 |
| 3,247,140 | 4/1966 | Isaacs et al. | 524/432 |
| 3,351,577 | 11/1967 | Krumm | 524/432 |
| 3,395,111 | 7/1968 | Mazzolini et al. | 260/32.8 |
| 3,900,441 | 8/1975 | King | 524/432 |
| 3,945,974 | 3/1976 | Schwarcz et al. | 524/432 |
| 3,957,723 | 5/1976 | Lawson et al. | 524/432 |
| 4,058,471 | 11/1977 | Glatti et al. | 524/432 |

FOREIGN PATENT DOCUMENTS 1080468 8/1967 United Kingdom .

*Primary Examiner*—Veronica P. Hoke
*Attorney, Agent, or Firm*—Andrew D. Maslow

[57] ABSTRACT

The addition of 2–30 parts of zinc oxide to plasticized polyvinyl halide compositions results in reduced smoke generation under burning conditions. Optionally calcium carbonate or magnesium oxide is incorporated as a synergistic filler.

9 Claims, No Drawings

LOW SMOKE PLASTICIZED POLYVINYL CHLORIDE

This is a continuation of application Ser. No. 210,646 filed Nov. 26, 1980 which is a continuation of application Ser. No. 928,489, filed Jul. 27, 1978, now abandoned, which, in turn, is a continuation of application Ser. No. 771,871, filed Feb. 25, 1977, now abandoned, which, in turn, is a continuation-in-part application of application Ser. No. 638,404, filed Dec. 8, 1975, now abandoned.

Smoke-retardant plasticized polyvinyl halide polymer compositions containing 2-30 parts of zinc oxide as the smoke retardant are disclosed.

Zinc oxide has previously been used with polyvinyl chloride resins as a stabilizer (U.S. Pat. No. 3,446,765), as a pigment (U.S. Pat. No. 2,682,484), and as a stabilizer for blowing agent promoters (U.S. Pat. No. 3,041,193).

Synthetic materials undergoing forced combustion emit smoke and toxic gases which are dangerous fire hazards because they impair escape, produce injury, limit survival and hamper fire fighting efforts. The latest statistics indicate that about half of the fatalities from accidental fires are caused by smoke rather than by heat or actual burning, thus emphasizing the need for the development of synthetic organic materials with as minimal smoke generating properties as possible. This is especially true for such applications as linings of aircraft, watercraft, motor vehicles, and house interiors, as well as for furniture and the like.

Under forced combustion, polyvinyl halide compositions are known to emit large amounts of black smoke and compositions which contain plasticizers, such as dioctyl phthalate, emit even more smoke than the unplasticized counterparts. Flame retardants such as the oxides of tin, lead, magnesium, manganese, tellurium, titanium, copper, chromium, aluminum, vanadium and tungsten are of no value as smoke retardants in polyvinyl halides. Indeed, antimony oxide, which is widely used as a flame retarder in polyvinyl halide compositions, may often increase the generation of smoke upon forced combustion.

Thus, in one aspect, this invention provides a plasticized polyvinyl halide with 2 to 30 parts by weight of zinc oxide. In another aspect, this invention provides a polyvinyl halide compounded with a mixture of plasticizers, an antimony compound as a flame retardant, and 2-30 parts by weight of zinc oxide. The preferred mixture of plasticizers is a blend of an alkyl trimellitate and an alkyl phthalate with antimony trioxide as the preferred antimony compound. A further aspect includes the incorporation of calcium carbonate or magnesium oxide as synergistic fillers.

Therefore, this invention serves to provide compositions with a markedly reduced tendency to smoke during combustion—a much desired safety feature. Accordingly, this invention results in an improvement to the safety characteristics in materials utilized in constructions.

In the practice of this invention, 2 to 30 parts of zinc oxide is used as a smoke retardant in a plasticized polyvinyl halide.

Polyvinyl halide resins applicable in this invention include homopolymers, copolymers, and polymer mixtures. Exemplary of applicable polyvinyl halide resins are:

1. Homopolymers, such as polyvinyl chloride, polyvinyl bromide, polyvinyl fluoride, polyvinylidene chloride, polydichlorostyrene and the like;
2. Copolymers, such as vinyl chloride-vinyl acetate, vinyl chloride-vinyl alcohol, vinylidene chloride-vinyl chloride, vinyl chloride-diethyl maleate, vinyl chloride-esters of unsaturated alcohols and unsaturated acids, and the like; and
3. Mixtures, such as polyvinyl chloride and polydichlorostyrene; polyvinyl chloride and vinyl acetate-vinyl chloride copolymer; and polyvinyl chloride, polyvinylidene chloride, and a copolymer of vinyl chloride-diethyl maleate, and the like.

The resins can be treated with the zinc oxide smoke retardant in any convenient manner. In some instances, smoke retardancy can be achieved by treating one or more surfaces of a plastic article with the additive-containing resin composition such that a treated surface is coated, i.e. overlaid or padded, with the additive composition. In like manner, textile fabrics of all types and constructions can be overlaid with a layer or thin skin of the additive composition.

Suitable plasticizers for the above types of resins, especially for polyvinyl chloride, are generally used in the range of 30 to 100 parts by weight per 100 parts by weight of polyvinyl halide and include high boiling esters, such as bis(2-ethylhexyl) adipate, bis(2-ethylhexyl) azelate, diethylene glycol dibenzoate, dipropylene glycol dibenzoate, tri-n-butyl citrate, acetyl tri-n-butyl citrate, epoxidized soybean oil, 2-ethylhexyl epoxy tallate, diethylene glycol dipolargonate, methyl phthalyl ethyl glycolate, butyl phthalyl butyl glycolate, bis(2-ethylhexyl) isophthalate, butyl oleate, tris(2-ethylhexyl) phosphate, tributoxyethyl phosphate, cresyl diphenyl phosphate, tricresyl phosphate, 2-ethylhexyl diphenyl phosphate, butyl octyl phthalate, di-n-octyl phthalate, diisooctyl phthalate, bis(2-ethylhexyl) phthalate, n-octyl n-decyl phthalate, isooctyl isodecyl phthalate, diisodecyl phthalate, ditridecyl phthalate, diphenyl phthalate, isodecyl benzyl phthalate, adipic acid polyester (mol. wt. 2200), azelaic acid polyester (mol. wt. 1500), sebacic acid polyester (mol. wt. 800), methyl ricinoleate, n-butyl acetylricinoleate, bis-(2-ethylhexyl) sebacate, butyl acetoxystearate, alkyl sulfonic acid ester of phenol and cresol and tris(2-ethylhexyl) trimellitate.

Other suitable plasticizers include chlorinated (54% chlorine) biphenyl, hydrogenated terphenyls, polyalkylnaphthalenes, chlorinated (24-70% chlorine) paraffin, N-cyclohexyl p-toluenesulfomamide, and copolymers of a conjugated diolefin having less than 7 carbon atoms, such as butadiene, with a copolymerizable monomer such as acrylonitrile or methyl isopropenyl ketone.

For minimum smoke generation, it has been found that a particularly effective plasticizer is a mixture of phthalate-type plasticizer and a trimellitate plasticizer. A blend of these two plasticizers in the weight ratio of phthalate to trimellitate of about 6/1 to about 1/1 produces a synergistic interaction when combined with zinc oxide smoke retardant and antimony trioxide flame retardant.

In general, improved flame retardance can be provided to compositions of this invention by incorporating therein metallic compounds wherein the metal is antimony, arsenic or bismuth in an amount of from about 1 to 30% by weight of the said polymeric composition. Antimony oxide is the compound that is preferred for use in the present invention, however, many other antimony compounds are suitable. Suitable antimony compounds include the sulfides of antimony, salts of the alkali metals of Group I of the Periodic Table, antimony salts of organic acids and their pentavalent derivatives and the esters of antimonius acids and their pentavalent derivatives. It is convenient to use sodium antimonite or potassium antimonite when it is desired to use an alkali metal salt of the antimony for compositions of this invention. U.S. Pat. No. 2,995,528 discloses suitable antimony salts of organic acids and their pentavalent derivatives. Compounds of this class include antimony butyrate, antimony valerate, antimony caproate, antimony heptylate, antimony caprylate, antimony pelargonate, antimony caprate, antimony cinnamate, antimony anisate, and their pentavalent dihalide derivatives. Likewise, the esters of antimonius acids and their pentavalent derivatives are disclosed in U.S. Pat. No. 2,993,924 such as tris(n-octyl) antimonite, tris(2-ethylhexyl) antimonite, tribenzyl antimonite, tris(beta-chloroethyl) antimonite, tris(beta-chloropropyl) antimonite, tri(beta-chlorobutyl) antimonite, and their pentavalent dihalide derivatives. Still other suitable organic antimony compounds are the cyclic antimonites such as trimethylol propane antimonite, pentaerythritol antimonite and glycerol antimonite. The corresponding arsenic and bismuth compounds can also be employed, in particular the oxides of arsenic and bismuth.

Other compounding ingredients may be used in the polyvinyl halide compositions of this invention including light and heat stabilizers, waxes, pigments, blowing agents, other flame retardants, and fillers such as carbon black, silica, berytes, clay, wood flour, magnesium oxide, calcium carbonate, and the like. When magnesium oxide or calcium carbonate are used as the fillers, a synergistic reduction in smoke generation occurs.

The prior art shows that there is usually a direct relationship between the smoke retardancy achievable and the amount of smoke retardant employed, usually a greater amount of smoke retardant will provide a greater amount of smoke retardancy, all other factors remaining the same. In some instances, there is a practical upper limit on the amount of smoke retardant used. This upper limit is based on secondary factors such as cost, case of blending or interference with some other desirable property of the substrate, for example. In the particular case of this invention, it has been found, unexpectedly, that the expected direct relationship between smoke retardancy and amount of smoke retardant does not prevail. In the case of zinc oxide plus a blend of a phthalate plasticizer and a trimellitate plasticizer at a total plasticizer content of about 70 phr, the smoke generation decreases rapidly as the amount of zinc oxide increases to about 7 parts per 100 parts of polyvinyl chloride and then, unexpectedly, the smoke generation increases as the amount of zinc oxide increases from about 10 parts to 30 parts per 100 parts of polyvinyl chloride. As the plasticizer content increases, the optimal concentration of zinc oxide also increases. Thus, the preferred amount of zinc oxide is from 3 to 30 parts per 100 parts of polyvinyl halide and the most preferred amount, for minimal smoke generation is 2 to 10 parts per 100 parts of polyvinyl halide when the plasticizer content is 30 to 50 parts, and is 5 to 12 parts when the plasticizer content is 50 to 100 parts.

The formulations of this invention can be used in any applications where plasticized polyvinyl halides are acceptable, including, but no limited to, coated fabrics, wire and cable insulation and jacketing, wall-covering and the like. Examples of suitable fibrous backing materials for coated fabric applications are cotton fabric, rayon fabric, felt, paper, polyester fabric and blends of the preceding. The fabric may be coated by calendering, by cast coating, by plastisol coating, by roller coating or by other methods which are well known in the art.

In the practice of this invention, the zinc oxide smoke retardant, antimony compound flame retardant, fillers and other compounding ingredients may be blended into the resin by any appropriate blending or mixing technique available in the art.

For the examples below, all of the compositions were prepared as follows, unless otherwise noted: The components were mixed first by hand and then for 10 minutes on a two-roller electrically heated differential mill maintained at a temperature of 150° C. The homogeneous mixture was then compression molded in a 30 ton hydraulic press for 10 minutes at 160° C. under full pressure. A 3"×6"×0.020" mold was used. In order to test the smoke generation of the various compositions, test specimens 3"×3"× about 0.022" thick were cut from the sheets prepared by compression molding the fluxed compositions as indicated above. Each specimen was placed on aluminum foil cut to size to permit overlapping of the specimen face on all four sides. The shapped specimen was placed in a holder and burned in the Aminco NBS smoke chamber according to the directions supplied and in accordance with NBS Technical Note 708, of Dec. 1971. The amount of smoke was measured by a photomultiplier. Specific optical density was calculated and then corrected for the soot remaining on the lens at the end of the test. Measurement is made of the attenuation of a light beam by smoke accumulating within a closed chamber due to the flaming combustion. Results are expressed in terms of specific optical density, which is derived from a geometrical factor and the measured optical density (absorbance). This is the single measurement most characteristic of the "concentration of smoke." The photometric scale used to measure smoke by this test method is similar to the optical density scale for human vision.

Compositions without zinc oxide present give a corrected maximum specific optical density in the range of 400 or more. In comparison, 10 parts of zinc oxide reduced this number to less than about 200. In the NBS test, the smaller the number, the less smoke. It is to be noted that most values for the maximum specific optical density of a composition are the average of measurements made on two or more test specimens of each composition. In general, two compositions are regarded as having different smoke generating properties if the difference in the maximum specific optical densities is greater than 10.

Further details of the reduction in smoke generation are shown by the following examples wherein all compositions are given in parts by weight for 100 parts of polyvinyl chloride resin. All compositions contained 1.8 parts of a barium-cadmium-zinc stabilizer, 2.7 parts of epoxidized soybean oil, and 0.2 parts stearic acid unless otherwise noted.

EXAMPLE I

A composition containing 100 parts polyvinyl chloride (Marvinol ® 22 of Uniroyal, Inc.), 70 parts by weight dioctylphthalate plasticizer (DOP), 15 parts by weight calcium carbonate filler, 10 parts by weight antimony trioxide ($Sb_2O_3$) and 10 parts by weight zinc oxide was hand mixed and then milled on a two roll mill for 10 minutes. The composition was compression molded to about 0.022" thickness as described earlier. Two samples each 3" square were then cut from the sheet and tested for smoke generation in the Aminco NBS smoke chamber using the flaming test.

The above procedure was then repeated except omitting the zinc oxide.

The average maximum specific optical densities for the two compositions were:

| | |
|---|---|
| With Zinc Oxide | 176 |
| Without Zinc Oxide | 374 |

EXAMPLE II

The procedure of Example I was repeated utilizing different plasticizers. The compositions and smoke generating results are summarized in Table I below.

In the Table, the plasticizers are given by trademark name and are the following:

Phthalate Type

Santicizer 711 = mixed ($C_1$–$C_{11}$) alkyl phthalate
PX-316 = mixed alkyl phthalate, higher percent linear than Santicizer 711

Phosphate Type

Santicizer 141 = 2-ethylhexyl diphenyl phosphate
Santicizer 143 = isodecyl diphenyl phosphate

Trimellitate Type

Santicizer 79TM = mixed ($C_7$–$C_9$) alkyl trimellitate

The results in Table I clearly show that the incorporation of 10 parts by weight zinc oxide dramatically reduced the amount of smoke generation of the compositions which contained antimony trioxide flame retardant irrespective of the plasticizer.

TABLE I

| Composition | A | B | C | D | E | F | G |
|---|---|---|---|---|---|---|---|
| Polyvinyl Chloride | 100 | 100 | 100 | 100 | 100 | 100 | 100 |
| Zinc Oxide | 0 | 10 | 10 | 10 | 10 | 10 | 10 |
| Santicizer 711 | 60 | 70 | | 60 | | | |
| IX-316 | | | 60 | | | | |
| Santicizer 141 | | | | | | 60 | |
| Santicizer 148 | | | | | 60 | | |
| Santicizer 79 TM | | | | | | | 80 |
| Calcium Carbonate | 30 | 15 | 15 | 15 | 15 | 15 | 15 |
| Antimony Trioxide | 10 | 10 | 10 | 10 | 10 | 10 | 10 |
| Maximum Specific Optical Density | 378 | 161 | 160 | 160 | 162 | 162 | 157 |

EXAMPLE III

The procedure of Example II was repeated utilizing a variety of fillers to show that although there are differences in the absolute amount of smoke generated by a particular composition depending upon the filler and its amount, zinc oxide acts as a smoke retardant in all cases. Maximum smoke suppression was obtained when the filler was calcium carbonate. The compositions and results are shown in Table II.

TABLE II

| Composition | H | I | J | K | L | M |
|---|---|---|---|---|---|---|
| Polyvinyl chloride | 100 | 100 | 100 | 100 | 100 | 100 |
| Zinc oxide | 0 | 10 | 10 | 10 | 10 | 10 |
| Magnesium oxide | | | 15 | | | |
| Calcium carbonate | 30 | 15 | | 15 | 20 | 30 |
| Santicizer 711 | 60 | 60 | 60 | | | |
| DOP | | | | 70 | 70 | 70 |
| Antimony trioxide | 10 | 10 | 10 | 10 | 10 | 10 |
| Maximum specific optical density | 370 | 160 | 163 | 176 | 185 | 172 |

EXAMPLE IV

The procedure of Example I was repeated to determine the effect of including antimony trioxide ($Sb_2O_3$) on the smoke generation of polyvinyl chloride compositions. With the mixed alkyl phthalate plasticizer (PX-316) identified in Example II and the filler combination used in these compositions, there was a synergism between zinc oxide and antimony trioxide with regard to smoke suppression.

The compositions and results are shown in Table III.

TABLE III

| Composition | N* | O | P |
|---|---|---|---|
| Polyvinyl chloride | 100 | 100 | 100 |
| Zinc oxide | 10 | 10 | 0 |
| Px-316 | 60 | 60 | 60 |
| Calcium carbonate | 15 | 15 | 15 |
| Antimony trioxide | 0 | 10 | 10 |
| Maximum specific optical density | 223 | 160 | 349 |

*A tin stabilizer (Thermolite 31 - an organotin mernaptide from MRT Chemicals Corp.), 2phr, was used in place of the epoxidized soybean oil and the Ba/Cd/Zn stabilizer.

EXAMPLE V

The procedure of Example I was repeated to demonstrate the relationship between zinc oxide concentration and smoke suppression. It is to be noted that the effect of zinc oxide on reducing the smoke generation is complex in showing initially a decrease in the generation of smoke with increasing amount of zinc oxide and then, quite unexpectedly showing an increase in smoke generation above an optimum amount—namely, about 5 to 12 parts by weight per 100 parts by weight of polyvinyl chloride, for a compound containing 70 phr of plasticizer. The compositions and results are shown in Table IV.

TABLE IV

| Composition | Q | R | S | T | U | V | W |
|---|---|---|---|---|---|---|---|
| Polyvinyl chloride | 100 | 100 | 100 | 100 | 100 | 100 | 100 |
| Zinc oxide | 0 | 1 | 3 | 5 | 10 | 20 | 30 |
| Santicizer 711 | 50 | 50 | 50 | 50 | 50 | 50 | 50 |
| Santicizer 79 TM | 20 | 20 | 20 | 20 | 20 | 20 | 20 |
| Calcium carbonate | 15 | 15 | 15 | 15 | 15 | 15 | 15 |
| Antimony trioxide | 10 | 10 | 10 | 10 | 10 | 10 | 10 |
| Maximum specific optical density | 321 | 226 | 231 | 163 | 156 | 170 | 192 |

EXAMPLE VI

This example shows that numerous other zinc compounds are either ineffective as smoke retardants for polyvinyl chloride compositions, or decidedly inferior to zinc oxide.

Test sheets were prepared according to the procedure of Example I from the following basic composition:

| | |
|---|---|
| Polyvinyl chloride | 100 |
| Santicizer 711 | 50 |
| Santicizer 79 TM | 20 |
| Calcium carbonate | 15 |
| Antimony trioxide | 10 |
| Zinc compound | 10 |

The results for the various zinc compounds tested were:

| | Compound | Maximum Specific Optical Density |
|---|---|---|
| X | Zinc oxide | 156 |
| Y | Zinc sulfate | 241 |
| Z | Zinc sulfide | 318 |
| AA | Zinc borate | 207 |
| AB | Zinc nitrate | 208 |
| AC | None | 321 |

EXAMPLE VII

The procedure of Example I was repeated to demonstrate the synergistic effect of a blend of a phthalate type plasticizer and a trimellitate plasticizer on smoke generation in a formulation containing an optimum amount of zinc oxide as a smoke retardant and antimony trioxide as a flame retardant. The observed synergism operates at a weight ratio of phthalate plasticizer to trimellitate plasticizer of about 6/1 to about 1/1.

TABLE V

| Composition | AD | AE | AF | AG | AH |
|---|---|---|---|---|---|
| Polyvinyl chloride | 100 | 100 | 100 | 100 | 100 |
| Zinc oxide | 10 | 10 | 10 | 10 | 10 |
| Santicizer 711 | 70 | 60 | 50 | 38 | 0 |
| Santicizer 79 TM | 0 | 10 | 20 | 38 | 80 |
| Calcium carbonate | 15 | 15 | 15 | 15 | 15 |
| Antimony oxide | 10 | 10 | 10 | 10 | 10 |
| Maximum specific optical density | 161 | 153 | 156 | 145 | 157 |

EXAMPLE VIII

Coated fabrics were prepared by mixing a coating compound on a two-roll mill, as in Example I and then by calendering the compound onto a 2.5 oz/yd$^2$ polyester-cotton knit fabric, by means of standard techniques. A coating thickness of 0.012" was used, at a temperature of 150° C.

The following compositions were coated onto the polyester-cotton fabric, and yielded the following smoke values:

| | AI | AJ* | AK |
|---|---|---|---|
| Polyvinyl chloride | 100 | 100 | 100 |
| Santicizer 711 | 50 | 50 | 60 |
| Santicizer 79 TM | 20 | 20 | 0 |
| Calcium carbonate | 15 | 15 | 15 |
| Antimony oxide | 10 | 10 | 10 |
| Zinc oxide | 0 | 10 | 10 |
| Maximum specific optical density | 165 | 89 | 122 |

*Thermolite 31 (2phr) was used in place of the Ba/Cd/Zn stabilizer.

EXAMPLE IX

This example shows that the optimal amount of zinc oxide, as demonstrated in Example V, increases as the amount of plasticizer is increased in a plasticized polyvinyl chloride composition. The results are shown in Table VI below.

TABLE VI

| Total Plasticizer Content (phr) | Optimal ZnO concentration (phr) |
|---|---|
| 20 | 0.5 |
| 30 | approx. 2 |
| 40 | 5 |
| 50 | approx. 10 |
| 70 | 10–12 |

What is claimed is:

1. A composition of matter comprising a thermoplastic polyvinyl halide, a stabilizer, and a plasticizer therefor in an amount equal to from 30 to 100 parts by weight said composition exhibiting substantially reduced smoke generation upon burning as a result of the presence therein of 2 to 30 parts by weight of zinc oxide, all concentrations being based on 100 parts by weight of polyvinyl halide.

2. The composition of claim 1 wherein the thermoplastic polyvinyl halide is polyvinyl chloride and its copolymers.

3. The composition of claim 1 wherein the plasticizer is present in about 30 to 50 parts by weight per 100 parts by weight of said polyvinyl halide, and the zinc oxide is present in about 2 to 10 parts by weight.

4. The composition of claim 1 wherein the plasticizer is present to about 50 to 100 parts by weight per 100 parts by weight of said polyvinyl halide, and the zinc oxide is present in about 5 to 12 parts by weight.

5. The composition of claim 1 wherein the plasticizer is selected from phthalates, phosphates, trimellitates and mixtures thereof.

6. The composition of claim 1 additionally containing up to about 30 parts by weight of antimony oxide ($Sb_2O_3$).

7. The composition of claim 1 additionally containing up to about 60 parts by weight of a filler selected from calcium carbonate and magnesium oxide.

8. The composition of claim 1 wherein the plasticizer is a mixture of a dialkyl phthalate and an alkyl trimellitate.

9. A thermoplastic polyvinyl halide composition comprising a polyvinyl halide, a stabilizer, a plasticizer therefor in an amount equal to from 30 to 100 parts by weight said composition exhibiting substantially reduced smoke generation upon burning as a result of the presence therein of a smoke suppressant consisting of 2 to 30 parts by weight of zinc oxide, up to about 30 parts by weight of antimony oxide and up to about 60 parts by weight of a filler selected from calcium carbonate and magnesium oxide all concentrations being based on 100 parts by weight of polyvinyl halide.

* * * * *